(12) United States Patent
Noda

(10) Patent No.: US 8,353,977 B2
(45) Date of Patent: Jan. 15, 2013

(54) HYDROGEN SEPARATOR AND METHOD OF OPERATING HYDROGEN SEPARATOR

(75) Inventor: Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 586 days.

(21) Appl. No.: 12/499,253

(22) Filed: Jul. 8, 2009

(65) Prior Publication Data

US 2010/0005960 A1 Jan. 14, 2010

(30) Foreign Application Priority Data

Jul. 14, 2008 (JP) ................................. 2008-182252
Jun. 2, 2009 (JP) ................................. 2009-133344

(51) Int. Cl.
*B01D 53/22* (2006.01)
*C01B 3/02* (2006.01)

(52) U.S. Cl. ............... 95/56; 95/55; 96/4; 96/10; 96/11; 422/617; 422/626; 422/627; 423/651; 423/655

(58) Field of Classification Search .................. 96/4, 10, 96/11, 9; 95/45, 55, 56; 422/617, 625, 626, 422/627, 216; 423/648.1, 651, 655
See application file for complete search history.

(56) References Cited

U.S. PATENT DOCUMENTS

| | | | | |
|---|---|---|---|---|
| 3,534,531 A * | 10/1970 | Takashi et al. | ...................... | 96/7 |
| 5,552,236 A | 9/1996 | Ohtake et al. | | |
| 7,329,310 B2 * | 2/2008 | Olapinski et al. | .................. | 96/11 |
| 7,662,435 B2 * | 2/2010 | Chellappa et al. | ............ | 427/236 |
| 2004/0173004 A1 | 9/2004 | Eblen, Jr. et al. | | |
| 2005/0100693 A1 | 5/2005 | Chellappa et al. | | |
| 2007/0269356 A1 * | 11/2007 | Mori et al. | ..................... | 422/239 |

FOREIGN PATENT DOCUMENTS

| | | |
|---|---|---|
| JP | 08-257376 A1 | 10/1996 |
| JP | 11-114388 A1 | 4/1999 |
| JP | 3388797 B2 | 1/2003 |
| JP | 2004-271525 A1 | 9/2004 |
| JP | 2006-289345 A1 | 10/2006 |
| WO | 02/070402 A2 | 9/2002 |
| WO | 2005/049224 A1 | 6/2005 |
| WO | WO 2005/049224 A1 * | 6/2005 |

* cited by examiner

*Primary Examiner* — Jason M Greene
(74) *Attorney, Agent, or Firm* — Burr & Brown (57) ABSTRACT

A hydrogen separator exhibits excellent hydrogen separation performance and durability and prevents scattering of an iron-containing substance that causes defects of a selective hydrogen permeable metal membrane in a first passage by covering an iron-containing metal surface that is exposed in the first passage and forms at least part of the first passage and a member disposed in the first passage with an iron component scattering prevention film at least in an area positioned on an upstream side with respect to a downstream end of a permeable section of the selective hydrogen permeable metal membrane in a flow direction of a fluid that flows through the first passage.

9 Claims, 5 Drawing Sheets

FLOW DIRECTION
OF FLUID

HYDROGEN SEPARATOR AND METHOD OF OPERATING HYDROGEN SEPARATOR

BACKGROUND OF THE INVENTION

The present invention relates to a hydrogen separator and a method of operating a hydrogen separator. More particularly, the present invention relates to a hydrogen separator that exhibits excellent hydrogen permeability and durability and suppresses defects of a selective hydrogen permeable metal membrane due to adhesion of an iron-containing substance, and a method of operating the same.

Hydrogen gas has been widely used as a basic material gas in the petrochemical industry, and has also attracted attention as a clean energy source. High-purity hydrogen gas is obtained by selectively separating hydrogen gas from a hydrogen-containing gas produced by various means using a natural gas, naphtha, coal, or a hydrocarbon as a raw material (raw material fluid).

A method that utilizes a hydrogen separator has been known as a means of separating a hydrogen gas. For example, a method that utilizes a hydrogen separator that includes a selective hydrogen permeable membrane that is provided on at least one side of an inorganic porous support and selectively allows hydrogen gas to pass through (selective permeability) has been known.

For example, a selective hydrogen permeable metal membrane represented by a metal film such as a palladium film or a palladium alloy film has been known as the selective hydrogen permeable membrane. The selective hydrogen permeable metal membrane utilizes a phenomenon in which palladium or a palladium alloy dissolves only hydrogen.

A hydrogen separator including the selective hydrogen permeable metal membrane is normally operated in a severe environment (e.g., high pressure, high temperature, or a repeated change in temperature) while repeating a hydrogen separation process. Therefore, a metal member has been used as a member that forms the hydrogen separator in order to improve durability, thermal conductivity, and sealing capability. However, a related-art hydrogen separator has a problem in which defects of a selective hydrogen permeable metal membrane occur, or a decrease in hydrogen separation performance occurs.

Therefore, technology that improves the performance of the selective hydrogen permeable metal membrane of a hydrogen separator has been studied.

For example, JP-A-8-257376 discloses technology that subjects the selective hydrogen permeable metal membrane to a heat treatment in an oxygen-containing gas in order to recover and stabilize the hydrogen permeability of the selective hydrogen permeable metal membrane. According to this technology, carbon or a carbon-containing compound that adheres to the selective hydrogen permeable metal membrane can be gasified and removed by a reaction with oxygen.

According to the technology disclosed in JP-A-8-257376, since carbon or the carbon-containing compound that adheres to the selective hydrogen permeable metal membrane can be removed by repeating a heat treatment in an oxygen-containing gas at intervals between the hydrogen separation processes, the hydrogen separation performance is recovered after the heat treatment in the oxygen-containing gas.

JP-A-2006-289345, JP-A-11-114388, and JP-A-2004-271525 disclose technology that covers the surface of the selective hydrogen permeable metal membrane with a protective layer. A situation in which a substance that floats in the passage of the hydrogen separator directly comes in contact with the selective hydrogen permeable metal membrane is prevented by the protective layer so that the durability of the selective hydrogen permeable metal membrane is improved.

According to the above technology, the substance that floats in the passage can be removed by additionally disposing a filter that contains a ceramic and/or a metal as the main component around the selective hydrogen permeable metal membrane so that contact of the substance with the selective hydrogen permeable metal membrane can be prevented.

However, since a hydrogen separator is normally used at a temperature of 400° C. or more, defects of the selective hydrogen permeable metal membrane and a decrease in hydrogen separation performance are not necessarily prevented even when using the technologies disclosed in JP-A-8-257376, JP-A-2006-289345, JP-A-11-114388, and JP-A-2004-271525.

For example, the technology disclosed in JP-A-8-257376 carries out the heat treatment in an oxygen-containing gas. Therefore, when a member that forms a passage of the raw material gas (raw material fluid) or a member disposed in the passage is made of a metal (e.g., stainless steel), the surface of the metal member is corroded due to oxidation and reduction. Moreover, a material that can be suitably used for the member that forms the passage of the hydrogen separator instead of stainless steel has not been proposed.

According to the technology disclosed in JP-A-2006-289345, JP-A-11-114388, and JP-A-2004-271525, a situation in which the substance that floats in the passage of the hydrogen separator comes in contact with the selective hydrogen permeable metal membrane can be prevented. However, defects of the selective hydrogen permeable metal membrane and a decrease in hydrogen separation performance cannot be reliably prevented. Moreover, since the surface of the selective hydrogen permeable metal membrane is covered with the protective layer, a decrease in productivity and an increase in maintenance work occur.

According to the above technology, a situation in which the substance that floats in the passage comes in contact with the selective hydrogen permeable metal membrane can be prevented by disposing the filter. However, a decrease in productivity and an increase in maintenance work inevitably occur as a result of additionally disposing the filter.

SUMMARY OF THE INVENTION

In view of the above-describe situation, an object of the present invention is provide a hydrogen separator that exhibits excellent hydrogen separation performance and excellent durability and a method of operating a hydrogen separator that exhibits excellent hydrogen separation performance and excellent durability.

The inventor of the present invention conducted extensive studies in order to achieve the above object. As a result, the inventor found that an iron-containing substance floats in the passage of the hydrogen separator and adheres to the selective hydrogen permeable metal membrane so that defects of the selective hydrogen permeable metal membrane occur.

The inventor found that adhesion of the iron-containing substance can be prevented by covering the iron-containing metal surface of a member that forms the passage or the like with an iron component scattering prevention film. This finding has led to the completion of the present invention. According to the present invention, the following hydrogen separator and the method of operating the hydrogen separator are provided.

[1] A hydrogen separator comprising: a vessel that has a raw material inlet for introducing a raw material fluid, a hydrogen outlet for discharging hydrogen selectively extracted from the raw material fluid, a residual raw material outlet for discharging the residual raw material fluid, and a fluid passage that connects the raw material inlet to the hydrogen outlet and the residual raw material outlet; and a selective hydrogen permeation section that is provided in the fluid passage to divide the fluid passage into a first passage that is connected to the raw material inlet and the residual raw material outlet and a second passage that is connected to the hydrogen outlet, and includes a selective hydrogen permeable metal membrane that selectively allows hydrogen contained in the raw material fluid to pass through, the selective hydrogen permeation section selectively allowing hydrogen to pass through from the first passage to the second passage through the selective hydrogen permeable metal membrane, an iron-containing metal surface that is exposed in the first passage and forms each of a member that forms the first passage and a member disposed in the first passage being at least partially covered with an iron component scattering prevention film at least in an area positioned on an upstream side with respect to a downstream end of a permeable section of the selective hydrogen permeable metal membrane in a flow direction of the fluid that flows through the first passage.

[2] The hydrogen separator according to [1], wherein the iron-containing metal surface that is exposed in the first passage and forms each of the member that forms the first passage and the member disposed in the first passage is completely covered with the iron component scattering prevention film at least in an area positioned on an upstream side with respect to the downstream end of the permeable section of the selective hydrogen permeable metal membrane in the flow direction of the fluid that flows through the first passage.

[3] The hydrogen separator according to [1] or [2], wherein the entire iron-containing metal surface of the vessel that is exposed in the first passage is covered with the iron component scattering prevention film.

[4] The hydrogen separator according to any one of [1] to [3], wherein the selective hydrogen permeable metal membrane is a metal film made of palladium (Pd) and/or an alloy that contains palladium.

[5] The hydrogen separator according to any one of [1] to [4], wherein the iron component scattering prevention film is a metal film or a metal oxide film that contains at least one metal selected from the group consisting of nickel (Ni), chromium (Cr), and a noble metal.

[6] The hydrogen separator according to [5], wherein the noble metal contains at least one of gold (Au), platinum (Pt), silver (Ag), palladium (Pd), rhodium (Rh), and iridium (Ir).

[7] The hydrogen separator according to any one of [1] to [6], wherein the selective hydrogen permeation section includes a porous support and the selective hydrogen permeable metal membrane that covers the surface of the porous support, the selective hydrogen permeation section being in the shape of a tube of which one end is closed and the other end has an opening; wherein the hydrogen separator includes a joint that is connected to the opening in the selective hydrogen permeation section and secures the selective hydrogen permeation section so that the opening in the selective hydrogen permeation section is connected to the hydrogen outlet; and wherein an iron-containing metal surface of the joint that is exposed in the first passage is covered with the iron component scattering prevention film at least in an area positioned on an upstream side with respect to the downstream end of the permeable section of the selective hydrogen permeable metal membrane in the flow direction of the fluid that flows through the first passage.

[8] The hydrogen separator according to any one of [1] to [7], further comprising a catalyst substance, and a catalyst holding member that holds the catalyst substance at a given position inside the first passage to prevent the catalyst substance from coming in contact with the selective hydrogen permeation section while allowing the raw material fluid to pass through, the catalyst substance and the catalyst holding member being disposed in the first passage, wherein an iron-containing metal surface of the catalyst holding member that is exposed in the first passage is covered with the iron component scattering prevention film at least in an area positioned on an upstream side with respect to the downstream end of the permeable section of the selective hydrogen permeable metal membrane in the flow direction of the fluid that flows through the first passage.

[9] A method of operating a hydrogen separator comprising operating the hydrogen separator according to any one of [1] to [8] while setting the temperature of hydrogen that passes through the selective hydrogen permeable metal membrane at 300 to 900° C.

[10] The method of operating a hydrogen separator according to [9], wherein the temperature of hydrogen that passes through the selective hydrogen permeable metal membrane is set at 400 to 800° C.

Since the hydrogen separator according to the present invention includes the iron component scattering prevention film, defects of the selective hydrogen permeable metal membrane are suppressed even when the hydrogen separator is used in a severe environment (e.g., high pressure, high temperature, or a repeated change in temperature) for a long period of time. Therefore, the hydrogen separator exhibits excellent hydrogen permeability and durability.

DETAILED DESCRIPTION OF THE INVENTION

Embodiments of the present invention are described below with reference to the drawings. Note that the present invention is not limited to the following embodiments. Various modifications and improvements may be made without departing from the scope of the present invention.

A. Outline of Hydrogen Separator According to the Present Invention

An outline of a hydrogen separator according to the present invention is described below with reference to FIGS. 1A, 1B, and 1C. A hydrogen separator 1 according to the present invention includes a vessel 2 that has a raw material inlet 3, a hydrogen outlet 4, a residual raw material outlet 5, and a fluid passage 6 that connects the raw material inlet 3 to the hydrogen outlet 4 and the residual raw material outlet 5, and a selective hydrogen permeation section 11 provided in the fluid passage 6. The selective hydrogen permeation section 11 includes a selective hydrogen permeable metal membrane 12, and is provided in the fluid passage 6 to divide the fluid passage 6 into a first passage 7 that is connected to the raw material inlet 3 and the residual raw material outlet 5 and a second passage 8 that is connected to the hydrogen outlet 4. The selective hydrogen permeable metal membrane 12 of the selective hydrogen permeation section 11 selectively allows hydrogen contained in the raw material fluid or its product that flows through the first passage 7 to pass through so that hydrogen enters the second passage 8 and is discharged from the hydrogen outlet 4. Furthermore, the hydrogen separator 1 according to the present invention is characterized in that an iron-containing metal surface 21 that is exposed in the first passage 7 and forms each of a member 9 that forms the first passage 7 and a member disposed in the first passage 7 (e.g. a joint 22 shown in FIG. 1A) is covered with an iron component scattering prevention film 31 at least in an area positioned on the upstream side with respect to the downstream end of a permeable section 15 of the selective hydrogen permeable metal membrane 12 in the flow direction of the fluid that flows through the first passage 7.

B. Selective Hydrogen Permeation Section

The selective hydrogen permeation section 11 is described below. The selective hydrogen permeation section 11 divides the fluid passage 6 into the first passage 7 and the second passage 8 (see FIGS. 1A, 1B, and 1C). The selective hydrogen permeable metal membrane 12 of the selective hydrogen permeation section 11 selectively allows hydrogen contained in the raw material fluid or its product to pass through while blocking the residual raw material fluid and its product. Note that hydrogen is caused to pass through the selective hydrogen permeable metal membrane due to the difference in hydrogen partial pressure between the first passage 7 and the second passage 8 through the selective hydrogen permeable metal membrane.

B-1. Selective Hydrogen Permeable Metal Membrane

The selective hydrogen permeable metal membrane 12 that is the main part of the selective hydrogen permeation section 11 is described below. The term "selective hydrogen permeable metal" used herein refers to a metal (e.g., palladium (Pd), niobium (Nb), tantalum (Ta), zirconium (Zr), or vanadium (V)) or an alloy thereof that selectively allows hydrogen to pass through due to dissolution and diffusion of hydrogen.

Since the selective hydrogen permeable metal membrane selectively allows hydrogen to pass through due to dissolution and diffusion of hydrogen, it is preferable to use the selective hydrogen permeable metal membrane in a heated state. The temperature of hydrogen that passes through the selective hydrogen permeable metal membrane is preferably 300° C. or more, and more preferably 400° C. or more, from the viewpoint of suppressing hydrogen embrittlement of the selective hydrogen permeable metal membrane. The temperature of hydrogen that passes through the selective hydrogen permeable metal membrane is preferably 900° C. or less, and more preferably 800° C. or less, from the viewpoint of ensuring the durability of the selective hydrogen permeable metal membrane and the hydrogen separator.

A preferable selective hydrogen permeable metal is palladium or an alloy that contains palladium (hereinafter referred to as "palladium alloy") that can selectively and efficiently allow hydrogen to pass through. It is more preferable to form the selective hydrogen permeable metal membrane 12 using a palladium alloy in order to prevent hydrogen embrittlement of palladium and improve high-temperature separation efficiency. In this case, the palladium alloy preferably has a content of a metal other than palladium of 5 to 50 wt %. It is most preferable that the palladium alloy contain silver (Ag) or copper (Cu) as a metal other than palladium in order to prevent hydrogen embrittlement of palladium.

Note that a selective hydrogen permeable metal membrane that is mainly formed of a metal other than palladium is considered to be the selective hydrogen permeable metal membrane 12 that is formed of palladium and/or a palladium alloy insofar as at least part of the surface of the selective hydrogen permeable metal membrane that comes in contact with the raw material fluid is covered with palladium and/or a palladium alloy.

When using a palladium-silver alloy (Pd—Ag alloy) as the selective hydrogen permeable metal, a palladium layer is formed by chemical plating or the like, and the surface of the palladium layer is plated with silver. Palladium and silver are then diffused with heating to form the selective hydrogen permeable metal membrane 12 formed of the palladium-silver alloy. When plating the surface of the palladium layer with silver, it is preferable to use chemical plating or electroplating that utilizes the palladium (Pd) layer as an electrode. In this case, the mass ratio (Pd:Ag) of palladium to silver is preferably 90:10 to 70:30.

B-2. Composite Structure of Selective Hydrogen Permeable Metal Membrane and Porous Support The selective hydrogen permeable metal membrane 12 normally exhibits selective hydrogen permeability even if the selective hydrogen permeable metal membrane 12 has a small thickness. Therefore, the selective hydrogen permeation section 11 may have a composite structure in which a thin film of the selective hydrogen permeable metal membrane 12 is supported by a porous support 14. The selective hydrogen permeation section 11 having such a composite structure can improve the mechanical strength of the selective hydrogen permeable metal membrane 12. The porous support 14 is not particularly limited insofar as the porous support 14 does not impair the selective hydrogen permeability of the selective hydrogen permeable metal membrane 12 to a large extent and allows the raw material fluid, hydrogen, and the like to pass through. When using the selective hydrogen permeation section 11 in which the selective hydrogen permeable metal membrane 12 is supported by the porous support 14, the selective hydrogen permeable metal membrane 12 may face the first passage 7 or the second passage 8. Note that the selective hydrogen permeation section 11 may include only the selective hydrogen permeable metal membrane 12. The porous support 14 may be formed of a material that has minute pores. It is preferable that the porous support 14 be formed of a material that mainly contains a ceramic and/or a metal that exhibits excellent corrosion resistance, heat resistance, and the like. Examples of the ceramic component that forms the porous support 14 include alumina, silica, silica-alumina, mullite, cordierite, zirconia, and the like. Examples of the metal component that forms the porous support 14 include stainless steel, Inconel, Incoloy, permalloy, Kovar, Invar, Super Invar, nickel, an iron-nickel alloy, and the like. The porous support 14 formed of a material that mainly contains a ceramic and/or a metal may include a small amount of unavoidable impurities and a component that is normally added when forming the porous support 14. The shape, size, and material of the porous support 14 are not particularly limited insofar as the functions of the selective hydrogen permeation section 11 (e.g., allowing the hydrogen-containing raw material fluid and its product to come in contact with the selective hydrogen permeable metal membrane 12 and allowing hydrogen to pass through and enter the second passage 8) are not impaired.

A method of depositing the selective hydrogen permeable metal membrane 12 on the surface of the porous support 14 is not particularly limited. A known method such as plating, sputtering, or chemical vapor deposition (CVD) may be suitably used. The selective hydrogen permeable metal membrane 12 of the selective hydrogen permeation section 11 may be produced by rolling or the like. It is preferable to deposit the selective hydrogen permeable metal membrane 12 on the surface of the porous support 14 by plating since the selective hydrogen permeable metal membrane 12 can be relatively easily deposited on the surface of a large porous support 14. In particular, a selective hydrogen permeable metal membrane 12 having a uniform thickness can be deposited on an uneven surface of the porous support 14 or the inner surface of a tube-shaped porous support 14 when using chemical plating (electroless plating).

C. Passage and Member That Forms Passage

The terms relating to the passage such as the fluid passage 6 are defined as follows. The fluid passage 6 of the hydrogen separator 1 according to the present invention refers to a space that allows the raw material fluid or its product (including hydrogen that has passed through the selective hydrogen permeation section 11) to pass through during operation of the hydrogen separator 1. The expression "forming the fluid passage 6" refers to forming a passage which limits the flow range of a fluid and in which a fluid flows by forming a space enclosed by a passage member formed of a material that exhibits a high sealing capability.

The member that forms the fluid passage 6 of the hydrogen separator 1 according to the present invention is preferably formed of a material that maintains a sealing capability and exhibits excellent pressure resistance, heat resistance, and thermal conductivity. A member made of a metal may be used as the member that forms the fluid passage 6 and satisfies such demands. It is preferable to use a member made of stainless steel that exhibits excellent corrosion resistance and economic efficiency.

The shape and the size of the fluid passage 6 of the hydrogen separator 1 according to the present invention are determined by the shape and the size of the member that forms passage. Note that an arbitrary design may be employed insofar as hydrogen can be selectively separated from the raw material fluid or its product by the selective hydrogen permeation section 11.

D. Member Disposed in Passage

In the hydrogen separator 1 according to the present invention, a member other than the selective hydrogen permeation section 11 and the member that forms the passage may be disposed in the fluid passage 6. Such a member may be appropriately designed corresponding to the functions of the hydrogen separator 1. Note that the member disposed in the fluid passage 6 includes the selective hydrogen permeation section 11 in the present specification.

Figure 4:
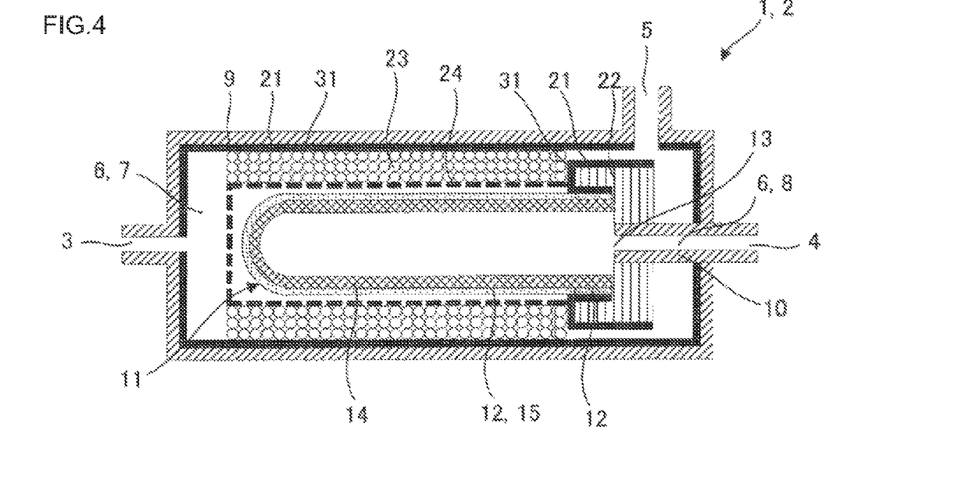
FIG. 4 is a schematic view showing an example of an embodiment of a hydrogen separator according to the present invention.
Figure 6:
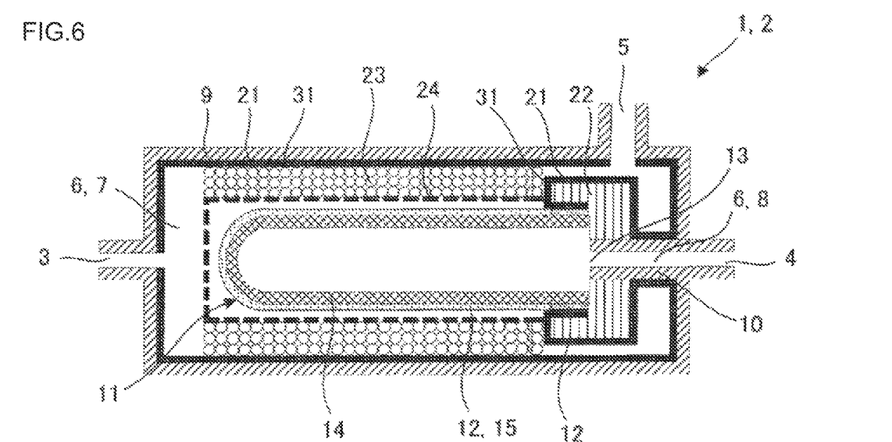
FIG. 6 is a schematic view showing an example of an embodiment of a hydrogen separator according to the present invention.

In the hydrogen separator 1 according to the present invention, a catalyst substance 23 that catalyzes a reforming reaction of the raw material fluid and the like may be disposed in the first passage 7, as shown in FIGS. 4 and 6. In this case, the selective hydrogen permeable metal membrane 12 may be damaged or unnecessary chemical reaction may be induced if the catalyst substance 23 comes in contact with the selective hydrogen permeable metal membrane 12. In the hydrogen separator 1 according to the present invention, it is preferable to prevent the catalyst substance 23 from coming in contact with the selective hydrogen permeation section 11 by holding the catalyst substance 23 at a given position inside the first passage 7 using a catalyst holding member 24. The catalyst holding member 24 is not particularly limited insofar as the catalyst holding member 24 has a shape that allows the raw material fluid or its product to pass through and allows hydrogen to selectively pass through the selective permeable metal membrane 12. For example, the catalyst holding member 24 may be formed of a metal mesh having an opening smaller than the minor axis of the catalyst substance 23, a porous body that contains a ceramic as the main component, or the like so as to prevent the catalyst substance 23 from coming in contact with the selective hydrogen permeation section 11. For example, the material for the catalyst holding member 24 is preferably stainless steel (the iron-containing metal surface 21 of the catalyst holding member 24 indicated by reference numeral 24 in FIGS. 4 and 6 is covered with the iron component scattering prevention film 31).

The basic elements of the hydrogen separator 1 according to the present invention have been described above. In the above description, stainless steel has been mentioned as a suitable material for the member that forms the passage, the catalyst holding member, and the like. However, in a severe operation environment at a temperature of 400° C. or more that is normally applied to the hydrogen separator 1, the surface of the stainless steel member that exhibits high corrosion resistance undergoes corrosion due to oxidation and reduction so that an iron-containing substance 25 is scattered into the passage and adheres to the selective hydrogen permeable metal membrane 12. As a result, the selective hydrogen permeable metal membrane 12 becomes defective (see FIG. 2, the details are described later). In order to solve this problem, the hydrogen separator 1 according to the present invention includes the iron component scattering prevention film 31 described below.

E. Iron Component Scattering Prevention Film

In the hydrogen separator 1 according to the present invention, the iron-containing metal surface 21 that is exposed in the first passage 7 and forms each of the member 9 that forms the first passage 7 and the member disposed in the first passage 7 (e.g. joint 22) is at least partially covered with the iron component scattering prevention film 31 at least in an area positioned on the upstream side with respect to the downstream end of the permeable section 15 of the selective hydrogen permeable metal membrane 12 in the flow direction of the fluid that flows through the first passage 7.

In the hydrogen separator 1 according to the present invention, it is preferable that the iron-containing metal surface 21 that is exposed in the first passage 7 and forms each of the member 9 that forms the first passage 7 and the member disposed in the first passage 7 (e.g., joint 22) be completely covered with the iron component scattering prevention film 31 at least in an area positioned on the upstream side with respect to the downstream end of the permeable section 15 of the selective hydrogen permeable metal membrane 12 in the flow direction of the fluid that flows through the first passage 7.

E-1. Definition of Terms Relating to Iron Component Scattering Prevention Film

Figure 2:
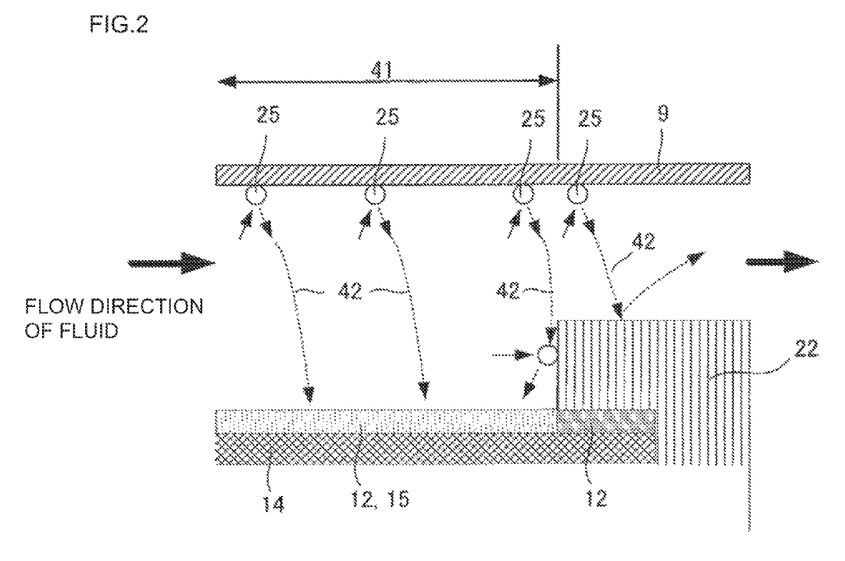
FIG. 2 is a schematic view illustrative of a fluid flow direction in a first passage and a float path of an iron-containing substance.

The above-mentioned terms are defined as follows. The term "iron-containing metal surface 21" refers to the surface of each of the member 9 that forms the first passage 7, the member disposed in the first passage 7, and the like that is formed of an iron-containing metal. The term "iron-containing metal" refers to any metal that contains iron including high-purity iron and an alloy (e.g., stainless steel) that contains iron in a significant ratio. The term "permeable section 15" of the selective hydrogen permeation section 11 refers to an area of the surface of the selective hydrogen permeable metal membrane 12 that faces the first passage, comes in contact with hydrogen present in the first passage, and allows hydrogen to pass through toward the second passage. As shown in FIG. 2, an area of the surface of the selective hydrogen permeable metal membrane 12 that is covered with a member having a high shielding capability (joint 22 in the example shown in FIG. 2) is excluded from the permeable section 15 of the selective hydrogen permeable metal membrane 12, for example.

The term "flow direction of the fluid that flows through the first passage 7" is determined by the direction in which the fluid flows through the first passage 7 during operation of the hydrogen separator 1 (e.g., during hydrogen separation or a heat treatment in an oxygen-containing gas). Note that the flow direction of the fluid that flows through the first passage 7 may be determined by a simple preliminary experiment by a skilled person (e.g., a wind-tunnel test using a fluid in which visible fine particles are dispersed).

The iron-containing substance 25 that is scattered from the iron-containing metal surface 21 of the member 9 that forms the first passage 7 or the like floats inside the first passage 7 along with the flow of the fluid that flows through the first passage 7. Therefore, a situation in which the iron-containing substance 25 that is scattered from the iron-containing metal surface 21 and floats inside the first passage 7 adheres to the selective hydrogen permeable metal membrane 12 can be prevented by covering the iron-containing metal surface 21 of each of the member 9 that forms the first passage 7 and the member disposed in the first passage 7 (e.g. joint 22) with the iron component scattering prevention film 31 at least in an area positioned on the upstream side with respect to the downstream end of the permeable section 15 of the selective hydrogen permeable metal membrane 12, as is clear from the schematic view shown in FIG. 2.

In the hydrogen separator 1 according to the present invention, since the amount of the iron-containing substance 25 that is scattered from the iron-containing metal surface 21 and floats inside the first passage 7 can be reduced by partially covering the iron-containing metal surface 21 with the iron component scattering prevention film 31 at least in an area positioned on the upstream side with respect to the downstream end of the permeable section 15 of the selective hydrogen permeable metal membrane 12, defects of the selective hydrogen permeable metal membrane 12 can be suppressed.

Furthermore, in the hydrogen separator 1 according to the present invention, adhesion of the iron-containing substance 25 to the selective hydrogen permeable metal membrane 12 can be more effectively prevented by completely covering the iron-containing metal surface 21 with the iron component scattering prevention film 31 at least in an area positioned on the upstream side with respect to the downstream end of the permeable section 15 of the selective hydrogen permeable metal membrane 12. Therefore, defects of the selective hydrogen permeable metal membrane 12 can be suppressed more effectively.

In the hydrogen separator 1 according to the present invention, the iron-containing metal surface 21 of each of the member 9 that forms the first passage 7 and the member disposed in the first passage 7 may be covered with the iron component scattering prevention film 31 in an area positioned on the downstream side with respect to the downstream end of the permeable section 15 of the selective hydrogen permeable metal membrane 12. In the hydrogen separator 1 according to the present invention, it is preferable to completely cover the iron-containing metal surface 21 of each of the member 9 that forms the first passage 7 and the member disposed in the first passage 7 with the iron component scattering prevention film 31 so that scattering of the iron-containing substance 25 can be reliably prevented.

In the hydrogen separator 1 according to the present invention, the surface other than the iron-containing metal surface 21 of each of the member 9 that forms the first passage 7 and the member disposed in the first passage 7 may be covered with the iron component scattering prevention film 31 insofar as the hydrogen permeability and the performance of the covering target member are not impaired. In the hydrogen separator 1 according to the present invention, the surface of each of the member 10 that forms the second passage 8 and the member disposed in the second passage 8 may be covered with the iron component scattering prevention film 31. In addition, in the hydrogen separator 1 according to the present invention, a filter or the like that traps an iron-containing substance contained in the raw material fluid may be disposed in the raw material inlet 3 or the first passage 7.

The above-mentioned filter or the like is preferably formed of a material that contains a ceramic and/or a metal as the main component. When the filter or the like is formed of an iron-containing metal, it is preferable to cover the surface of the filter or the like with the iron component scattering prevention film.

E-2. Material for Iron Component Scattering Prevention Film

A specific form of the iron component scattering prevention film 31 is not particularly limited insofar as scattering of the iron-containing substance 25 from the iron-containing metal surface 21 can be prevented. Scattering of the iron-containing substance 25 from the iron-containing metal surface 21 can be prevented by providing the iron-containing metal surface 21 with corrosion protection using the iron component scattering prevention film 31 or preventing the iron-containing metal surface 21 from coming in contact with the raw material fluid using the iron component scattering prevention film 31, for example. The iron component scattering prevention film 31 may have a non-dense structure (e.g., a structure having pores) in order to reduce deformation of the iron component scattering prevention film 31 due to the difference in coefficient of thermal expansion between the iron-containing metal surface 21 and the iron component scattering prevention film 31, for example. The iron component scattering prevention film 31 may be formed of a highly magnetic material so that the iron component scattering prevention film 31 captures the iron-containing substance 25 scattered from the iron-containing metal surface 21. Incidentally, the inventor of the present invention confirmed that most of the iron-containing substances 25 that adhere to the selective hydrogen permeable metal membrane 12 and cause defects of the selective hydrogen permeable metal membrane 12 have a particle diameter of about 1 to 100 μm.

The iron component scattering prevention film 31 that prevents scattering of the iron-containing substance 25 by the above-described mechanism may be formed of an arbitrary material such as a corrosion-resistant metal (described in detail later), a ceramic, an organic material (e.g., resin or carbon fibers), or a composite material of these materials insofar as selective hydrogen permeability is not impaired. The iron component scattering prevention film 31 may be formed by a known method corresponding to the material. The iron component scattering prevention film 31 may be formed using a material selected corresponding to the material, shape, and coefficient of thermal expansion of the iron-containing metal surface 21, the size and the production step of the member, and the like.

When forming the iron component scattering prevention film 31 using a ceramic as the main component, the raw material for the ceramic, the degree of crystal orientation of the ceramic that forms the film, and the like may be appropriately set taking account of the thermal conductivity of the member that forms the iron-containing metal surface 21 and the like. The term "ceramic" refers to a crystalline or non-crystalline oxide, nitride, boride, or the like. For example, when covering the iron-containing metal surface 21 made of stainless steel with the iron component scattering prevention film 31 formed of a ceramic as the main component, zirconia, titania, alumina, silica, or the like may be used as the ceramic used as the main component of the iron component scattering prevention film 31.

When using the iron component scattering prevention films 31 formed of an organic material (e.g., resin or carbon fibers) in the hydrogen separator according to the present invention, the iron component scattering prevention film 31 may be formed of an arbitrary compound insofar as separation of hydrogen from the raw material fluid or its product is not impaired (i.e., the compound does not undergo a chemical reaction with hydrogen or does not remove hydrogen from the raw material fluid or its product). In the hydrogen separator 1 according to the present invention, an organic coating used as a corrosion-resistant coating formed on a metal surface or an organic magnetic film disclosed in Japanese Patent No. 3388797 or the like may be used as the iron component scattering prevention film 31. The performance that prevents scattering of the iron-containing substance 25 may be enhanced by covering the surface of a film that contains a ceramic as the main component or a corrosion-resistant metal film (described later) with an organic magnetic film. For example, the hydrogen separator 1 according to the present invention may be provided with a capability of capturing the iron-containing substance 25 by covering the surface of the catalyst holding member 24 (see FIGS. 4 and 6) with a corrosion-resistant metal film and covering the surface of the corrosion-resistant metal film with an organic magnetic film.

E-3. Iron Component Scattering Prevention Film Formed of Corrosion-Resistant Metal Film In the hydrogen separator 1 according to the present invention, it is preferable to use a metal film or a metal oxide film formed of a corrosion-resistant metal as the iron component scattering prevention film 31 since such a film can be used at a high temperature, can be deposited on the surface of various materials, and a method that can easily deposit such a film on an uneven surface has been established. It is more preferable to use a corrosion-resistant metal film as the iron component scattering prevention film 31 from the viewpoint of adhesion to a metal member formed of stainless steel or the like. It is preferable to use the metal film or the metal oxide film formed of at least one corrosion-resistant metal selected from the group consisting of nickel (Ni), chromium (Cr), and a noble metal as the iron component scattering prevention film 31. As the noble metal, gold (Au), platinum (Pt), silver (Ag), palladium (Pd), rhodium (Rh), iridium (Ir), or the like may be suitably used. The above-mentioned corrosion-resistant metal exhibits low reactivity with palladium as compared with iron, or the selective hydrogen permeable metal membrane 12 is rarely corroded even if the corrosion-resistant metal is separated and adheres to the selective hydrogen permeable metal membrane 12. Moreover, the corrosion-resistant metal film has an advantage in that the difference in coefficient of thermal expansion between the corrosion-resistant metal film and the metal member (e.g., stainless steel) is small. Among the above-mentioned corrosion-resistant metals, it is preferable to use nickel (Ni), chromium (Cr), or silver (Ag) from the viewpoint of reactivity and cost, with chromium (Cr) or silver (Ag) being particularly preferable.

For example, corrosion resistance may be improved by double nickel plating that forms a semi-gloss nickel plating layer on the iron-containing metal surface 21 and forms a gloss nickel plating layer on the semi-gloss nickel plating layer. In the hydrogen separator 1 according to the present invention, a metal film formed by forming a nickel plating layer on the iron-containing metal surface 21 and forming a chromium plating layer on the nickel plating layer may be used as the iron component scattering prevention film 31. In the hydrogen separator 1 according to the present invention, corrosion resistance can be improved due to a reduction in corrosion current by forming a microporous layer (microporous chromium plating layer) as the chromium plating layer that is the upper layer of the nickel-chromium metal film and is exposed in the first passage 7.

When using the metal film or the metal oxide film formed of the corrosion-resistant metal as the iron component scattering prevention film 31, the metal film may be formed by a known method such as plating, sputtering, chemical vapor deposition (CVD), or thermal spraying. For example, it is preferable form a corrosion-resistant metal film as the iron component scattering prevention film 31 by plating since the metal film can be relatively easily formed on the surface of a large member. In particular, an iron component scattering prevention film 31 formed of a corrosion-resistant metal film and having a uniform thickness can be formed on the iron-containing metal surface 21 of an uneven member or a tube-shaped member when using chemical plating (electroless plating).

For example, when forming a nickel metal film on the iron-containing metal surface 21 made of stainless steel as the iron component scattering prevention film 31, the thickness of the nickel metal film is preferably 0.1 to 100 μm. When forming a gold metal film on the iron-containing metal surface 21 made of stainless steel as the iron component scattering prevention film 31, the thickness of the gold metal film is preferably 0.1 to 10 μm.

In the hydrogen separator 1 according to the present invention, a situation in which the iron-containing substance 25 that adheres to the selective hydrogen permeable metal membrane 12 and causes defects of the selective hydrogen permeable metal membrane 12 is scattered from the iron-containing metal surface 21 and floats inside the first passage 7 can be prevented by covering the iron-containing metal surface 21 with the iron component scattering prevention film 31, as described above. Therefore, occurrence of defects of the selective hydrogen permeable metal membrane 12 due to adhesion of the iron-containing substance 25 is significantly reduced in the hydrogen separator 1 according to the present invention, even if the area of the permeable section 15 of the selective hydrogen permeable metal membrane 12 or the area of the iron-containing metal surface 21 is increased.

F. Another Embodiment of Hydrogen Separator

Figure 1A:
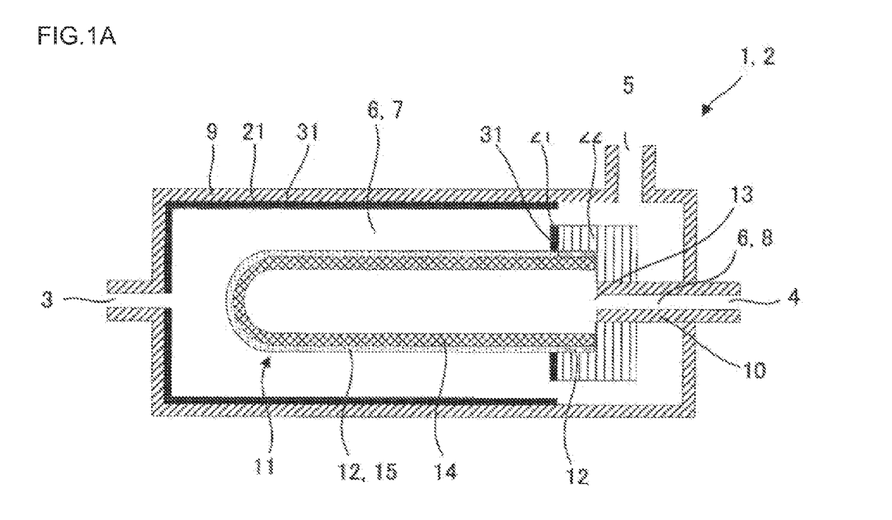
FIG. 1A is a schematic view showing an example of an embodiment of a hydrogen separator according to the present invention.
Figure 1B:
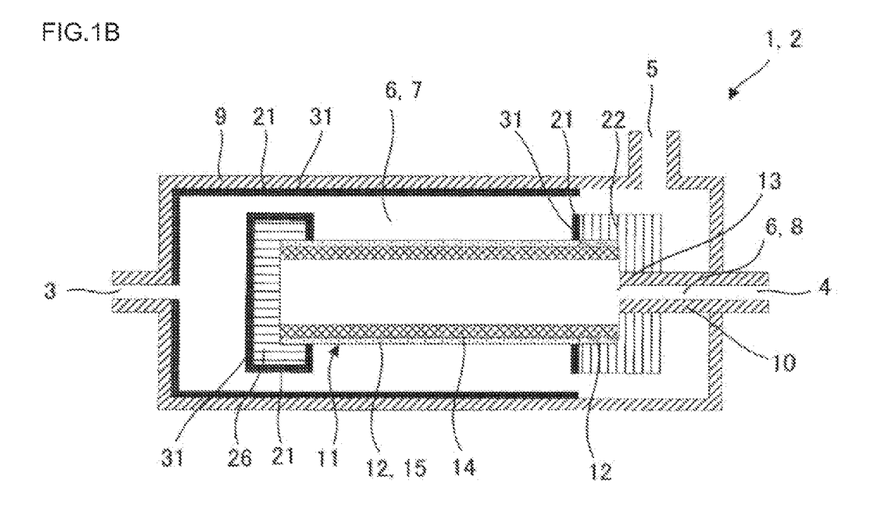
FIG. 1B is a schematic view showing an example of an embodiment of a hydrogen separator according to the present invention.
Figure 1C:
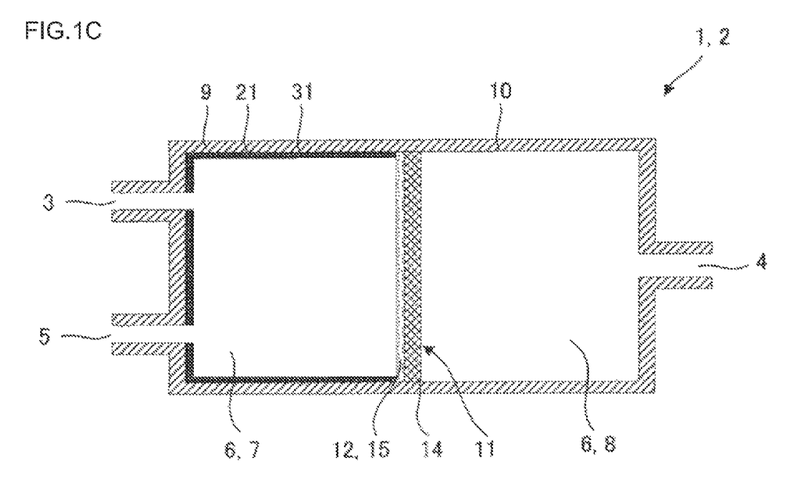
FIG. 1C is a schematic view showing an example of an embodiment of a hydrogen separator according to the present invention.

The hydrogen separator 1 shown in FIGS. 1A and 1B that includes a hollow selective hydrogen permeation section 11 of which one end is closed and the other end is open and in which the area of the permeable section 15 of the selective hydrogen permeable metal membrane 12 is increased can also be used for a long period of time due to the effects of the iron component scattering prevention film 31.

The selective hydrogen permeation section 11 of the hydrogen separator 1 shown in FIG. 1A includes the porous support 14 and the selective hydrogen permeable metal membrane 12 that covers the surface of the porous support 14, and is in the shape of a tube of which one end has an opening 13. The selective hydrogen permeation section 11 of the hydrogen separator 1 shown in FIG. 1B has a hollow shape of which one end has an opening 13 and the other end is closed by a sealing member 26. The hydrogen separator 1 shown in FIGS. 1A and 1B includes the joint 22 that is connected to the opening 13 in the selective hydrogen permeation section 11 and secures the selective hydrogen permeation section 11 so that the opening 13 in the selective hydrogen permeation section 11 is connected to the hydrogen outlet 4. In the hydrogen separator 1 shown in FIGS. 1A and 1B, the iron-containing metal surface 21 of each of the joint 22 and the sealing member 26 exposed in the first passage 7 is covered with the iron component scattering prevention film 31 at least in an area positioned on the upstream side with respect to the downstream end of the permeable section 15 of the selective hydrogen permeable metal membrane 12 in the flow direction of the fluid that flows through the first passage 7.

The joint 22 is not particularly limited insofar as the joint 22 is fitted to the opening 13 in the selective hydrogen permeation section 11 and can be connected to the member 9 that forms the first passage 7, the member 10 that forms the second passage 8, or the member disposed in the first passage 7 or the second passage 8 to secure the selective hydrogen permeation section 11. In the hydrogen separator 1 according to the present invention, a tube-shaped member that connects the hydrogen outlet 4 to the opening 13 in the hollow selective hydrogen permeation section 11 may be disposed in the vessel 2 as the member 10 that forms the second passage, as shown in FIGS. 1A and 1B. Specifically, the tube-shaped member 10 that forms the second passage is provided so that one end is connected to (communicates with) the hydrogen outlet 4 and the other end is connected to (communicates with) the opening 13 in the selective hydrogen permeation section 11. In this case, the joint 22 that is fitted to the selective hydrogen permeation section 11 may be provided (see FIGS. 1A and 1B) so that the end of the tube-shaped member 10 that forms the second passage communicates with the opening 13 in the selective hydrogen permeation section 11.

Figure 5:
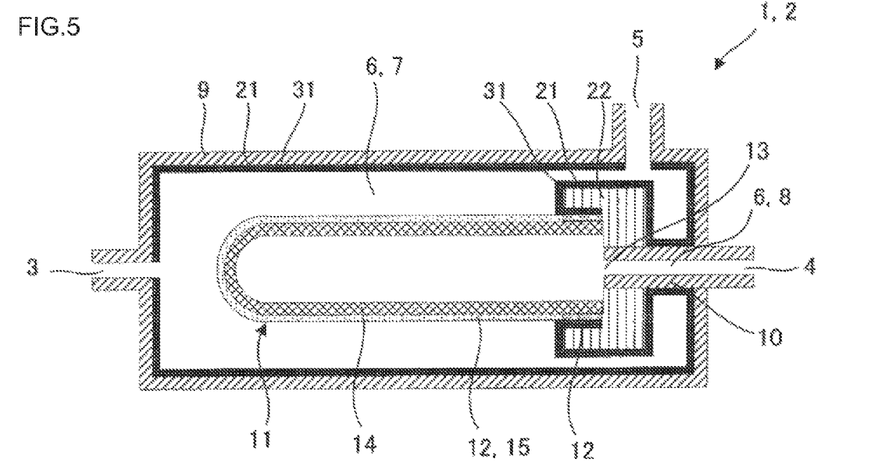
FIG. 5 is a schematic view showing an example of an embodiment of a hydrogen separator according to the present invention.

In the hydrogen separator 1 according to the above embodiment, the iron-containing metal surface 21 of the joint 22 exposed in the first passage 7 must be covered with the iron component scattering prevention film 31 at least in an area positioned on the upstream side with respect to the downstream end of the permeable section 15 of the selective hydrogen permeable metal membrane 12 in the flow direction of the fluid that flows through the first passage 7. Furthermore, in the hydrogen separator 1 according to the present invention, it is preferable that the entire iron-containing metal surface 21 of the joint 22 be covered with the iron component scattering prevention film 31 (see FIGS. 5 and 6) in order to reliably prevent scattering of the iron-containing substance 25.

In FIGS. 1A and 1B, one hollow selective hydrogen permeation section 11 of which one end is closed and the other end is open is provided. Note that the hydrogen separator 1 according to the present invention may include a plurality of hollow selective hydrogen permeation sections 11 in order to increase the area of the permeable section 15 of the selective hydrogen permeable metal membrane 12. On the other hand, in the hydrogen separator 1 according to the present invention, the area of the permeable section 15 of the selective hydrogen permeable metal membrane 12 may be increased by covering the surface of a fold-shaped porous support 14 with the selective hydrogen permeable metal membrane 12. The hydrogen separator 1 according to the present invention may be arbitrarily configured so that the area of the permeable section 15 of the selective hydrogen permeable metal membrane 12 is increased.

The hydrogen separator 1 according to the present invention can be used for a long period of time in the same manner as in the above embodiment by disposing a fin-shaped member made of stainless steel of which the iron-containing metal surface 21 is covered with the iron component scattering prevention film 31 on the member 9 that forms the first passage 7 to appropriately adjust the flow direction of the raw material fluid, for example.

G. Helium Leakage Amount Change Rate

The effect of suppressing defects of the selective hydrogen permeable metal membrane 12 of the hydrogen separator 1 according to the present invention by the iron component scattering prevention film 31 is indicated by a helium leakage amount change rate. The term "helium leakage amount change rate" in the present specification is defined as follows. Specifically, the hydrogen separator with a cumulative operating time of 0 hours is heated to 600° C. in a nitrogen atmosphere, and air (normal pressure) is introduced into the fluid passage 6 for 0.5 hours to stabilize the hydrogen permeability. Hydrogen (0.7 MPa) is then introduced into the fluid passage 6, and a hydrogen separation process is performed for 300 hours. The helium leakage amount change rate is defined as the ratio of the helium leakage amount (He leakage amount (ml/min·cm$^2$)) after 300 hours of the hydrogen separation process (cumulative hydrogen separation process time: 300 hours) to the helium leakage amount before the hydrogen separation process (cumulative hydrogen separation process time: 0 hours). The helium leakage amount change rate of the hydrogen separator 1 according to the present invention is preferably 2.0 or less. If the helium leakage amount change rate is 2.0 or less, the hydrogen separator 1 according to the present invention exhibits excellent hydrogen separation performance during the operation period. The helium leakage amount is determined by supplying helium gas (0.9 MPa) to one side of the hydrogen separation membrane when the cumulative hydrogen separation process time is 0 hours and 300 hours, and measuring the amount of helium gas that leaks from the other side of the hydrogen separation membrane per unit area and unit time.

The helium leakage amount change rate is used as an index for optimizing the range covered with the iron component scattering prevention film 31, the thickness and the material of the iron component scattering prevention film 31, and the like. A preferred embodiment (particularly the material and the covering range of the iron component scattering prevention film 31) may be derived by a skilled person from the hydrogen separator 1 included in the technical scope of the present invention by a simple preliminary experiment by utilizing the helium leakage amount change rate as an index. A skilled person may produce the hydrogen separator 1 of the same design so that a variation in the helium leakage amount change rate is reduced. Specifically, the helium leakage amount change rate is one of important factors that characterize the hydrogen separator 1 according to the present invention.

EXAMPLES

The present invention is further described below by way of examples. Note that the present invention is not limited to the following examples.

Example 1

Figure 3:
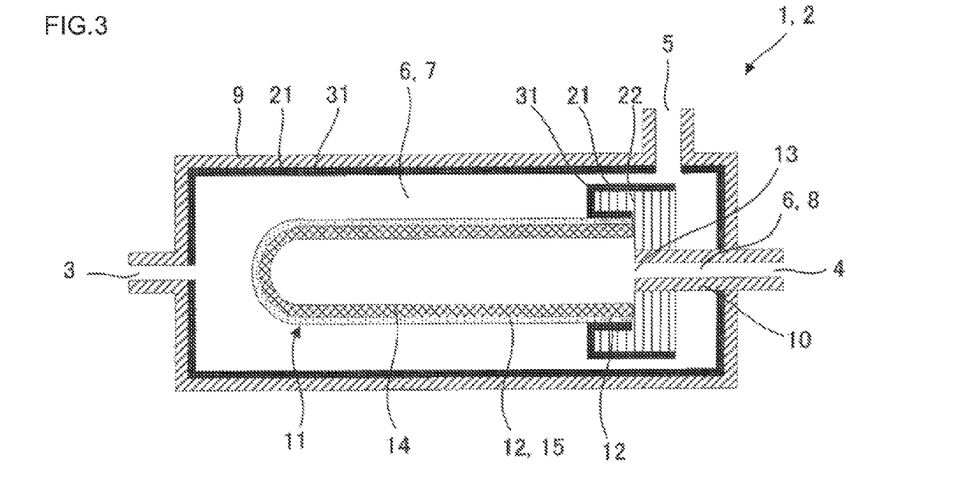
FIG. 3 is a schematic view showing an example of an embodiment of a hydrogen separator according to the present invention.

A hydrogen separator 1 shown in FIG. 3 including a vessel 2 made of stainless steel of which the inner surface was covered with an Ni film (iron component scattering prevention film 31), a selective hydrogen permeation section 11, and a joint 22 was produced. The selective hydrogen permeation section 11 was produced by plating the surface of a tube (bag)-shaped porous alumina support (outer diameter: 30 mm, length: 500 mm) with a Pd—Ag alloy film (selective hydrogen permeable metal membrane 12). The ratio of Ag to Pd was 20:80 (parts by mass). The selective hydrogen permeation section 11 was secured by fitting the stainless steel joint 22 on the side of the opening 13. Note that the surface of the joint 22 was covered (plated) with an Ag film (iron component scattering prevention film 31) in an area near the opening 13 in the selective hydrogen permeation section 11. The helium leakage amount before and after a hydrogen separation process was measured using the hydrogen separator 1.

Example 2

A hydrogen separator 1 (FIG. 3) was produced in the same manner as in Example 1, except that a stainless steel joint 22 that was plated with Au as the iron component scattering prevention film 31 was used. The helium leakage amount before and after the hydrogen separation process was measured using the hydrogen separator 1.

Example 3

A hydrogen separator 1 was produced in the same manner as in Example 1, except that a catalyst holding member 24 formed of a stainless steel metal cover of which the surface was plated with Cr as the iron component scattering prevention film 31 was disposed (see FIG. 4). A Ru/alumina catalyst substance 23 was disposed in one of the spaces formed by dividing the first passage 7 by the catalyst holding member 24 (i.e., in the space in which the selective hydrogen permeation section 11 was not disposed (see FIG. 4). The helium leakage amount before and after a methane-steam reforming process was measured using the hydrogen separator 1.

Comparative Example 1

Figure 7:
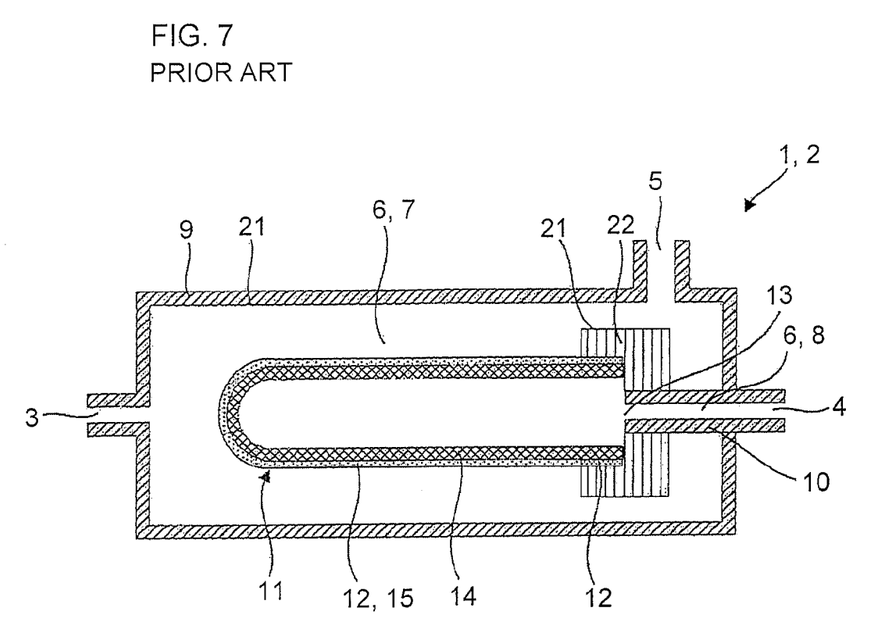
FIG. 7 is a schematic view showing an example of a related-art hydrogen separator.

A hydrogen separator 1 was produced in the same manner as in Example 1, except that the joint 22 and the vessel 2 were not covered with the iron component scattering prevention film 31 (see FIG. 7). The helium leakage amount before and after the hydrogen separation process was measured using the hydrogen separator 1.

(Evaluation 1)

The helium leakage amount before and after the hydrogen separation process was measured as follows using the hydrogen separators 1 of Examples 1 and 2 and Comparative Example 1. Specifically, the selective hydrogen permeation section 11 was heated to 600° C. in a nitrogen atmosphere by heating the vessel 2. Air (normal pressure) was introduced into the fluid passage 6 through the raw material inlet 3 for 0.5 hours to stabilize the hydrogen permeability of the selective hydrogen permeation section 11. Hydrogen (0.7 MPa) was then introduced into the vessel 2 through the raw material inlet 3, and the hydrogen separation process was performed for 300 hours. Helium gas (0.9 MPa) was supplied to one side of the selective hydrogen permeable metal membrane 12 before and after the hydrogen separation process to measure the helium leakage amount (ml/min·cm$^2$). The measurement results and the helium leakage amount change rate are shown in Table 1. As shown in Table 1, the helium leakage amount of the hydrogen separators 1 of Examples 1 and 2 did increase after the hydrogen separation process was performed for 300 hours. The hydrogen separators 1 of Examples 1 and 2 had a helium leakage amount change rate of 1.2 and 1.3, respectively. On the other hand, in Comparative Example 1, the helium leakage amount increased after the hydrogen separation process was performed for 300 hours, and the helium leakage amount change rate was as high as 89. The leakage area of the selective hydrogen permeable metal membrane 12 of Comparative Example 1 was observed using an electron microscope. As a result, defects due to a reaction of iron (Fe) with the Pd—Ag alloy were observed.

TABLE 1

| | He leakage amount before hydrogen separation process (ml/min · cm$^2$) | He leakage amount after hydrogen separation process (ml/min · cm$^2$) | Helium leakage amount change rate |
|---|---|---|---|
| Example 1 | 0.027 | 0.033 | 1.2 |
| Example 2 | 0.060 | 0.076 | 1.3 |
| Comparative Example 1 | 0.022 | 1.966 | 89 |

(Evaluation 2)

The helium leakage amount before and after the methane-steam reforming process was measured using the hydrogen separator 1 of Example 3. Specifically, the selective hydrogen permeation section 11 was heated to 600° C. in a nitrogen atmosphere by heating the vessel 2. Methane and steam (ratio: 1:3) were introduced into the vessel 2 through the raw material inlet 3 at a pressure of 0.4 MPa, and the methane-steam reforming process was performed for 300 hours. Helium gas (0.9 MPa) was supplied to one side of the selective hydrogen permeable metal membrane 12 before and after the methane-steam reforming process to measure the helium leakage amount (ml/min·cm$^2$). The measurement results and the helium leakage amount change rate are shown in Table 2.

As shown in Table 2, the helium leakage amount of the hydrogen separator 1 of Example 3 did increase after the methane-steam reforming process. The helium leakage amount change rate was as low as 1.8.

TABLE 2

| | He leakage amount before methane-steam reforming process (ml/min · cm$^2$) | He leakage amount after methane-steam reforming process (ml/min · cm$^2$) | Helium leakage amount change rate |
|---|---|---|---|
| Example 3 | 0.045 | 0.083 | 1.8 |

The present invention relates to a hydrogen separator wherein a situation in which an iron-containing substance that floats in the fluid passage, adheres to the selective hydrogen permeable metal membrane, and causes defects of the selective hydrogen permeable metal membrane can be prevented by covering the iron-containing metal surface that is exposed in the fluid passage with the iron component scattering prevention film, and wherein the hydrogen separator consequently does not show a decrease in hydrogen separation performance during long-term operation, and to a method of operating the same.

What is claimed is:

1. A hydrogen separator comprising:
a vessel that has a raw material inlet for introducing a raw material fluid, a hydrogen outlet for discharging hydrogen selectively extracted from the raw material fluid, a residual raw material outlet for discharging the residual raw material fluid, and a fluid passage that connects the raw material inlet to the hydrogen outlet and the residual raw material outlet; and
a selective hydrogen permeation section that is provided in the fluid passage to divide the fluid passage into a first passage that is connected to the raw material inlet and the residual raw material outlet and a second passage that is connected to the hydrogen outlet, and includes a selective hydrogen permeable metal membrane that selectively allows hydrogen contained in the raw material fluid to pass through, the selective hydrogen permeation section selectively allowing hydrogen to pass through from the first passage to the second passage through the selective hydrogen permeable metal membrane,
an iron-containing metal surface that is exposed in the first passage and forms at least part of the first passage and a member disposed in the first passage that is at least partially covered with an iron component scattering prevention film at least in an area positioned on an upstream side with respect to a downstream end of a permeable section of the selective hydrogen permeable metal membrane in a flow direction of the fluid that flows through the first passage,
wherein a part of the second passage connecting to the hydrogen outlet is covered with a joint including the iron containing metal surface and has an iron component scattering prevention film on at least a surface facing toward the raw material inlet.

2. The hydrogen separator according to claim 1, wherein the entire iron-containing metal surface of the vessel that is exposed in the first passage is covered with the iron component scattering prevention film.

3. The hydrogen separator according to claim 1, wherein the selective hydrogen permeable metal membrane is a metal film made of palladium (Pd) and/or an alloy that contains palladium.

4. The hydrogen separator according to claim 1, wherein the iron component scattering prevention film is a metal film or a metal oxide film that contains at least one metal selected from the group consisting of nickel (Ni), chromium (Cr), and a noble metal.

5. The hydrogen separator according to claim 4, wherein the noble metal contains at least one of gold (Au), platinum (Pt), silver (Ag), palladium (Pd), rhodium (Rh), and iridium (Ir).

6. The hydrogen separator according to claim 1, wherein the selective hydrogen permeation section includes a porous support and the selective hydrogen permeable metal membrane that covers the surface of the porous support, the selective hydrogen permeation section being in the shape of a tube of which one end is closed and the other end has an opening.

7. The hydrogen separator according to claim 1, further comprising:
a catalyst substance, and a catalyst holding member that holds the catalyst substance at a given position inside the first passage to prevent the catalyst substance from coming in contact with the selective hydrogen permeation section while allowing the raw material fluid to pass through, the catalyst substance and the catalyst holding member being disposed in the first passage,
wherein an iron-containing metal surface of the catalyst holding member that is exposed in the first passage is covered with the iron component scattering prevention film at least in an area positioned on an upstream side with respect to the downstream end of the permeable section of the selective hydrogen permeable metal membrane in the flow direction of the fluid that flows through the first passage.

8. A method of operating a hydrogen separator comprising operating the hydrogen separator according to claim 1 while setting the temperature of hydrogen that passes through the selective hydrogen permeable metal membrane at 300 to 900° C.

9. The method of operating a hydrogen separator according to claim 8,
wherein the temperature of hydrogen that passes through the selective hydrogen permeable metal membrane is set at 400 to 800° C.

* * * * *